UNITED STATES PATENT OFFICE.

RICHARD JUST AND HUGO WOLFF, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

ANTHRACENE DYE AND PROCESS OF MAKING SAME.

1,003,268.   Specification of Letters Patent.   Patented Sept. 12, 1911.

No Drawing.   Application filed September 30, 1909. Serial No. 520,352.

*To all whom it may concern:*

Be it known that we, RICHARD JUST and HUGO WOLFF, doctors of philosophy and chemists, subjects, respectively, of the King of Saxony and the Grand Duke of Baden, residing at Ludwigshafen-on-the-Rhine, Germany, have invented new and useful Improvements in Anthracene Dyes and Processes of Making Same, of which the following is a specification.

The specification of Patent No. 837,775 dated Dec. 12, 1906 (see also British Letters Patent No. 22,519/05) describes the production of coloring matters containing halogen by treating with halogen, or with other halogenizing agent, the coloring matters of the anthracene series which can be obtained by heating a compound containing a benzanthrone group with alkali. The specification of Patent No. 906,367 dated December 8th, 1908, (see also British Letters Patent No. 20837/06) describes the production of coloring matter of the anthracene series by treating, with caustic alkali, a halogenated benzanthrone compound, such for instance as halogen benzanthrone and halogen benzanthrone-quinolin. The coloring matters produced according to the said specification of Patent No. 906,367 are structurally different from those employed according to the process of the said specification of Patent No. 837,775.

We have now discovered that the coloring matters which are obtainable by treating a halogenated benzanthrone compound with caustic alkali and which have the isoviolanthrene structure, on being treated with halogen, or with a compound which evolves halogen, can be converted into new halogen derivatives and that these halogen derivatives constitute very valuable coloring matters which dye cotton, from the vat, brilliant shades. For instance chlorinated isoviolanthrene yields shades which are more brilliant and possess a stronger tinge of red than does the unchlorinated coloring matter, and brominated isoviolanthrene yields clear bluish violet shades which cannot be obtained by means of isoviolanthrene itself.

The new coloring matters possess the following generic properties. They consist when dry of from dark blue to dark violet powders which are insoluble in water and in dilute acids and alkalis. They are soluble in concentrated sulfuric acid yielding green solutions, they dissolve in nitrobenzene with a red color, and they dissolve in alkaline hydrosulfite yielding blue vats with color cotton blue shades, which shades on washing and drying are converted into from reddish violet to bluish violet.

The coloring matter which we desire to be understood as claiming specifically is dichlor-isoviolanthrene, and it produces on cotton reddish violet shades of excellent fastness.

The following examples will serve to illustrate further the nature of our invention and how it can be carried into practical effect, but our invention is not confined to these examples. The parts are by weight.

Example 1: Suspend ten parts of isoviolanthrene (obtainable as described in Example 9 of the said specification of British Letters Patent No. 20,837 A. D. 1906) in one hundred parts of nitrobenzene and, while at ordinary temperature, add from fifteen, to twenty, parts of sulfuryl chlorid. Heat slowly to from fifty, to sixty, degrees centigrade and maintain this temperature until the evolution of hydrochloric acid ceases. Then filter off the coloring matter, wash it with nitrobenzene and then with alcohol, and dry it. It is a dark violet powder having a metallic luster and is insoluble in water and in dilute acids and alkalis. Its solution in concentrated sulfuric acid is grass-green and does not alter upon the addition of boric acid. It is difficultly soluble in most organic solvents and yields in nitrobenzene a magenta-red solution having a red-brown fluorescence, and can be re-crystallized from this solvent and be obtained in the form of small blue crystals. Analysis points to the product being a dichlor-isoviolanthrene. It is soluble in alkaline hydrosulfite yielding a blue vat which colors cotton blue shades, which on washing and drying are converted into a very fast and brilliant reddish violet.

Example 2: Suspend ten parts of isoviolanthrene in two hundred and fifty parts of nitrobenzene and, while at a temperature of from fifty, to sixty, degrees centigrade, pass a current of chlorin into the suspension until the chlorination is finished. When the mixture is cold, work up as described in the foregoing Example 1. The coloring matter appears to possess properties similar to those possessed by the product of Example 1.

Example 3: Boil together, gently, for several hours, six parts of finely divided isoviolanthrene, five hundred parts of nitrobenzene and twenty parts of bromin. When the mixture is cold, filter off the coloring matter, wash it with nitrobenzene and alcohol, and dry it. It is a dark blue powder which yields a grass-green solution in concentrated sulfuric acid. It is more difficultly soluble in most organic solvents, than is the chlorin derivative. Its solution in nitrobenzene is magenta-red having a red-brown fluorescence. With alkaline hydrosulfite it yields a blue vat which colors cotton blue shades which, upon washing and drying, are converted into bluish violet. Analysis points to the compound being a dibrom derivative.

Example 4: Heat together, under pressure, five parts of isoviolanthrene and five parts of bromin at one hundred and fifty degrees centigrade, for ten hours, and stir up the reaction product with water. Filter off the coloring matter, and wash and dry it. It appears to be identical with that obtainable according to the foregoing Example 3.

In a similar manner the other coloring matters produced according to the aforesaid specification of Patent No. 906,367 can be treated with halogen. The quantity of halogen employed can be varied and in this way, for instance, coloring matters containing a smaller proportion of halogen can be obtained. Instead of nitrobenzene, other suitable solvent, or diluent, can be employed.

Now what we claim is:—

1. The process of producing coloring matter of the anthracene series by treating with a halogenizing agent the coloring matter which is obtainable by treating a halogenated benzanthrone compound with caustic alkali, and which possesses the isoviolanthrene structure.

2. The process of producing coloring matter of the anthracene series by treating isoviolanthrene with sulfuryl chlorid.

3. As new articles of manufacture the coloring matters which can be obtained by treating with a halogenizing agent the coloring matter which is obtainable by treating a halogenated benzanthrone compound with caustic alkali, and which possesses the isoviolanthrene structure, which new coloring matters possess the following generic properties they consist when dry of from dark blue to dark violet powders which are insoluble in water and in dilute acids and alkalis; they are soluble in concentrated sulfuric acid yielding green solutions; they dissolve in nitrobenzene with a red color; and they dissolve in alkaline hydrosulfite yielding blue vats which color cotton blue shades which shades on washing and drying are converted into from reddish violet to bluish violet.

4. As a new article of manufacture dichlorisoviolanthrene which can be obtained by treating isoviolanthrene with sulfuryl chlorid, and which consists when dry of a dark violet powder which is insoluble in water and in dilute acids and alkalis, which is soluble in concentrated sulfuric acid yielding a green solution, which dissolves in nitrobenzene with a magenta-red color, and which dissolves in alkaline hydrosulfite yielding a blue vat which colors cotton blue shades, which shades on washing and drying are converted into a very fast reddish violet.

In testimony whereof we have hereunto set our hands in the presence of two subscribing witnesses.

RICHARD JUST.
HUGO WOLFF.

Witnesses:
ERNEST F. EHRHARDT,
ERNEST L. IVES.